Sept. 3, 1935.  R. H. COWDERY  2,013,626
SHOVEL
Filed Sept. 19, 1933
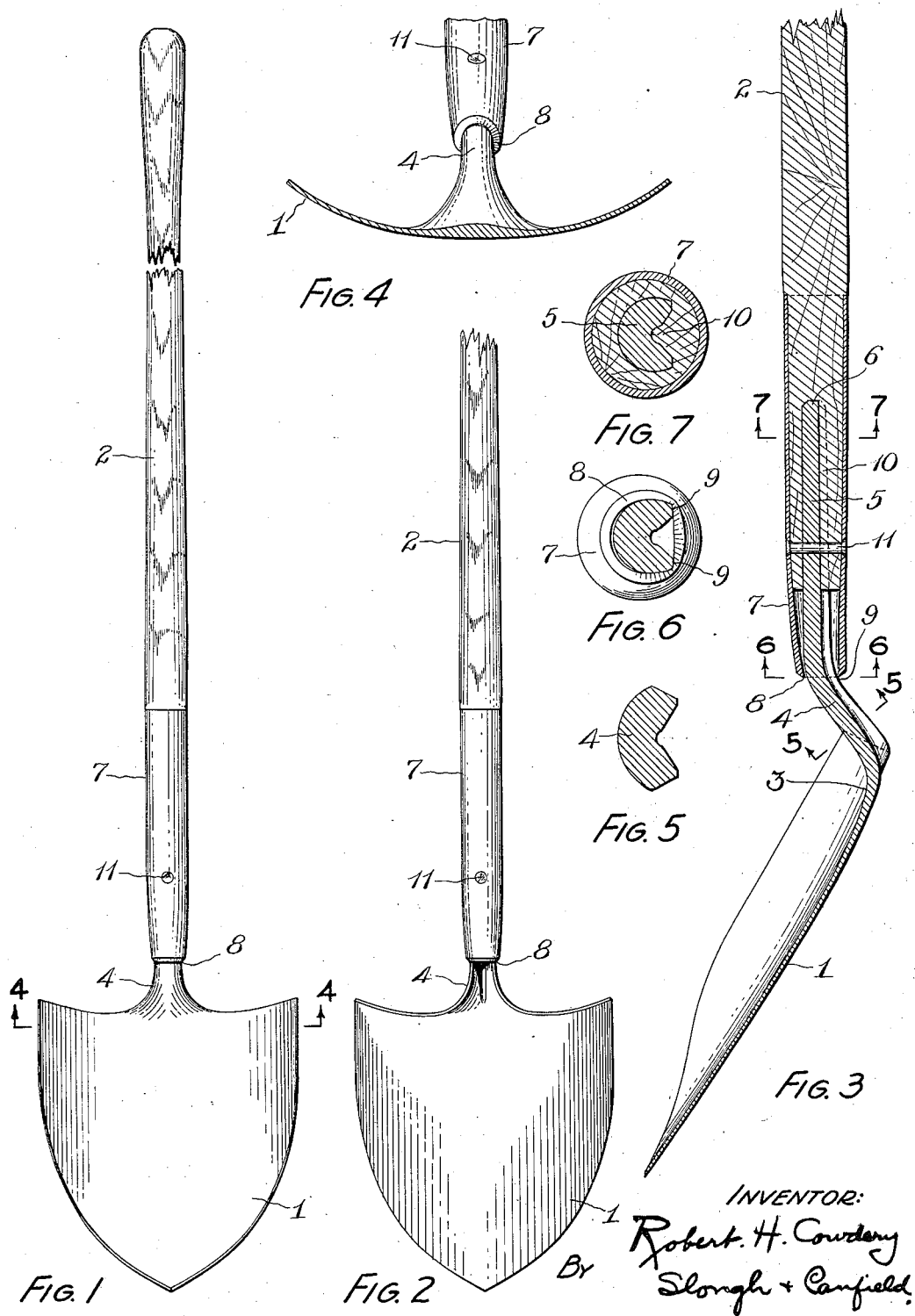
INVENTOR:
Robert H. Cowdery
By Slough + Canfield
ATTORNEYS.

Patented Sept. 3, 1935

2,013,626

UNITED STATES PATENT OFFICE 2,013,626

SHOVEL

Robert H. Cowdery, Geneva, Ohio, assignor to The American Fork & Hoe Company, Cleveland, Ohio, a corporation of Ohio Application September 19, 1933, Serial No. 690,097

5 Claims. (Cl. 294—49)

This invention relates to shovels and similar tools having a metal blade and a handle secured thereto.

It has been customary heretofore to construct shovels and similar tools with a blade having a tapering socket into which a wooden handle is fitted. This construction is not entirely satisfactory as the tapered socket is difficult and expensive to manufacture, and because it is difficult to properly secure a handle in a socket of this kind.

It is an object of the present invention to provide an improved shovel having a blade with an integral shank by means of which the handle may be secured to the blade.

A further object of the invention is to provide improved means for attaching a handle to a shovel blade.

Another object of the present invention is to provide means by which the handle can be rigidly secured to the shovel blade.

Other objects of the invention and features of novelty will be apparent from the following description taken in connection with the accompanying drawing, in which:

Fig. 1 is a front elevational view of a shovel embodying my invention, this view being taken with the handle disposed perpendicular to the line of vision;

Fig. 2 is a rear elevational view of the shovel shown in Fig. 1, this view being taken with the handle disposed perpendicular to the line of vision;

Fig. 3 is an enlarged partial medial longitudinal sectional view of the shovel shown in Fig. 1 with parts of the handle omitted;

Fig. 4 is an enlarged sectional view, taken substantially from the plane 4—4 of Fig. 1, with parts of the handle omitted;

Fig. 5 is a sectional view taken substantially along the plane 5—5 of Fig. 3;

Fig. 6 is a sectional view taken substantially along the plane 6—6 of Fig. 3; and Fig. 7 is a sectional view taken substantially along the plane 7—7 of Fig. 3.

Referring to the drawing, it will be seen that the shovel has a blade, indicated generally by the reference character 1, and a handle indicated generally by the reference character 2. The blade of the shovel, as shown, is similar to that of the shovels now in common use and is formed of relatively thin metal and curved adjacent the edges. The blade is preferably slightly thicker adjacent the rear edge and adjacent the shank than at the front edge.

A shank, indicated generally by the reference character 4, is formed integral with the blade. This shank is somewhat thicker than the blade, and is off-set from the blade, as is best shown in Fig. 3 of the drawing, and terminates in a substantially straight portion 5 at the end. The extreme end of the shank is preferably slightly pointed as at 6 in order to facilitate insertion of the shank into the socket in the handle.

The shank is channel shaped, and transversely is concavo-convex or U-shaped in cross-section throughout substantially its entire length, the radius of curvature of the U increasing from substantially the upper end of the shank toward the shovel blade, the rate of change of curvature increasing more rapidly adjacent the shovel blade than in the portion of the shank spaced from the blade. The concave face of the channel shaped or concavo-convex shank is preferably at the rear of the shovel. As is best shown in Fig. 3 of the drawing, the shank flares out gradually and curvilinearly merges with the shovel blade as at 3 without abrupt angles or bends in the metal. This produces a shank which can be easily constructed as an integral part of the shovel blade, and which has great strength, particularly against bending stresses in a plane from front to back of the shovel.

The handle 2 is in general similar to shovel handles now in use, being constructed of any suitable hard wood. The lower end of the handle is slightly reduced in diameter and tapered somewhat, as shown in Fig. 3, and is fitted with a ferrule indicated generally by the reference character 7. This ferrule is tubular and is preferably slightly tapered or conical, being of larger diameter adjacent the upper end than at the lower end. The ferrule is also preferably constructed with the walls somewhat thicker adjacent the lower end than in the upper portion, as is clearly shown in Fig. 3 of the drawing, and the lower end of the ferrule preferably extends below the lower end of the handle.

The extreme lower end of the ferrule may be provided with an inturned head 8 which prevents expansion of the ferrule. This head also engages and bridges the opposite side walls of the channel-shaped shank of the blade, as at 9, as is best shown in Fig. 6. This helps to hold the shank rigidly in the handle and to prevent rotation of the shovel body relative to the handle.

The ferrule is preferably long enough so that it extends substantially above the upper end of the shank, and it may be straight from end to end, or it may have the lower end curved slightly to the rear as shown in the drawing.

To assemble the shovel a longitudinally extending hole is bored in the lower end of the handle to provide a socket and the shank of the shovel body is driven into this socket, which preferably is small enough so that the shank fits very tightly. When the shank is driven into place, the fibers of the wood handle at the sides of the shank, being constrained by the ferrule, are compressed while the fibers at the back of the shank will be crowded into the recess at the back of the shank as shown at 10 in Fig. 7. This results in a very rigid joint between the handle and the shovel blade, and, because of the shape of the shank, there can be no rotative movement of the handle relative to the shank.

In order to insure that the shank will not pull out of the handle a hole is bored through the ferrule, the handle, and the shank, and a rivet 11 is placed in this hole and headed over. This hole preferably extends from front to back of the handle as this does not weaken the handle as much as a hole extending crosswise of the handle. It will be seen that the hole extends only through the base of the channel-shaped shank, leaving the sides unweakened so that the shank has adequate strength, particularly in a plane from front to rear.

It will be seen that the shovel provided by my invention has the handle rigidly secured to the shovel blade and that the construction employed is very strong, particularly in the plane in which the greatest stresses are imposed upon the shovel. It will also be seen that the shovel can be constructed very cheaply and easily, preferably by a forging process, although within the purview of my invention a rolling process can be employed.

While the invention has been described and illustrated in connection with one form of shovel having a long handle, it should be understood that the invention is not limited to this type of shovel, or even to shovels, and that the construction provided by this invention may be employed not only on other kinds of shovels but also on analogous tools such as spades, and the like.

Having thus described my invention, I claim:

1. A tool of the spade type comprising blade and shank stem portions, said portions comprising integral elements of a unitary forging, said shank stem being of generally channel form and with the thickness of the channel base comprising at least half of the channel depth, said blade comprising a shank stem root bearing portion of generally channeled form, the material thereof being forced outwardly toward the front face of the blade to make said portion of concavo-convex form with its channel side facing rearwardly, said blade portion being of progressively reduced thickness proceeding from said root bearing portion in lateral and longitudinal directions towards the sides and forward edge of the blade.

2. In a tool of the class described, a blade having a shank integrally formed therewith, the shank being of longitudinally channeled form, and the shank wall at the channel base comprising substantially half of the transverse shank dimension a handle having a socket therein to receive said shank, a ferrule to reenforce the handle adjacent the socket, and means to retain the handle, ferrule, and shank in assembled relation, said means including a member extending through aligned apertures in said handle, ferrule, and shank.

3. In a tool of the class described, a blade having a shank formed integral therewith, the shank being concavo-convex in transverse cross-section, and of generally circular external contour the convex face of the shank being toward the front of the blade, a handle having a socket therein adapted to receive said shank, the cross-sectional area of the shank walls being substantially greater than the corresponding included area and means to reenforce said handle adjacent said socket.

4. A tool of the spade type comprising blade and shank stem portions, said portions comprising integral elements of a unitary forging, said shank stem having channeled walls thickest in the vicinity of the blade portion but spaced therefrom and of progressively reduced thickness in both longitudinal directions therefrom, the thickness of the shank walls comprising a major portion of the corresponding transverse dimension of the shank said blade comprising a shank stem root bearing portion of generally channeled form, the material thereof being forced outwardly toward the front face of the blade to make said portion of concavo-convex form with its channel side facing rearwardly, said blade portion being of progressively reduced thickness proceeding from said root bearing portion in lateral and longitudinal directions towards the sides and forward edge of the blade, said shank stem being longitudinally channeled, the channel thereof continuing into the channel of said root bearing portion of the blade.

5. A tool of the spade type comprising integral blade and shank portions, said shank portion being generally channel-shaped in cross-section, and with the area of the channel walls being substantially greater than the area included therebetween, said shank portion being of progressively reduced thickness along a plane bisecting the channel in a longitudinal direction from a point of greatest thickness adjacent the blade, the blade having a channeled shank root portion, said shank root portion increasing in width longitudinally from said point towards the blade to merge with the blade shank root portion, and the channel side of the shank root portion facing rearwardly relative to the front face of the blade.

ROBERT H. COWDERY.